United States Patent
Olson et al.

(10) Patent No.: US 11,212,387 B1
(45) Date of Patent: Dec. 28, 2021

(54) PROMPT LIST MODIFICATION

(71) Applicant: Intrado Corporation, Omaha, NE (US)

(72) Inventors: Terry Olson, Bennington, NE (US); Mark L. Sempek, Blair, NE (US); Roger Wehrle, Omaha, NE (US)

(73) Assignee: Intrado Corporation, Omaha, NE (US)

( * ) Notice: Subject to any disclaimer, the term of this patent is extended or adjusted under 35 U.S.C. 154(b) by 0 days.

(21) Appl. No.: 16/920,392

(22) Filed: Jul. 2, 2020

(51) Int. Cl.
*H04M 3/493* (2006.01)

(52) U.S. Cl.
CPC ........ *H04M 3/493* (2013.01); *H04M 2201/42* (2013.01); *H04M 2203/355* (2013.01)

(58) Field of Classification Search
CPC ............. H04M 3/493; H04M 2201/42; H04M 3/5166; H04M 2203/355; H04M 7/006; H04M 3/4936; H04M 3/5175; H04M 3/5191; H04M 3/5183; H04M 1/271; H04M 3/36; H04M 15/00; H04M 15/09; H04M 2215/66; H04M 3/51; H04M 17/00; H04M 2201/40; H04M 2250/66; H04M 3/2218; H04M 3/436; H04M 7/0048; H04M 2203/251; H04M 3/5238; H04M 7/003; H04M 15/51; H04M 15/68; H04M 2203/2011; H04M 2203/254; H04M 3/24; H04M 3/4938; H04M 3/533; H04M 1/2535; H04M 2201/60; H04M 2203/558; H04M 3/42144; H04M 3/4878; H04M 1/724; H04M 2250/22; H04M 3/242; H04M 3/42153; H04M 3/42161; H04M 3/4228; H04M 3/42323; H04M 3/53383; H04M 3/537; H04M 15/10; H04M 15/8221; H04M 15/844; H04M 1/247; H04M 1/2473; H04M 1/2749; H04M 1/6505; H04M 1/72412; H04M 1/7243; H04M 1/72436; H04M 1/72469; H04M 2203/2061; H04M 2203/253; H04M 2203/4536; H04M 2203/556; H04M 2203/651; H04M 2250/74; H04M 3/007; H04M 3/42068; H04M 3/42102; H04M 3/4211; H04M 3/42178; H04M 3/42204; H04M 3/42382; H04M 3/4935; H04M 3/527; H04M 3/53; H04M 3/5322; H04M 3/53308; H04M 3/53316; H04M 3/53333; H04M 7/0012
See application file for complete search history.

(56) References Cited

U.S. PATENT DOCUMENTS

| | | | | |
|---|---|---|---|---|
| 8,761,373 B1 * | 6/2014 | Raghavan | ........... | H04M 3/4936 379/265.03 |
| 8,781,098 B2 * | 7/2014 | Blanchard | ............. | H04M 3/493 379/265.03 |
| 10,305,758 B1 * | 5/2019 | Bhide | ...................... | H04L 41/22 |
| 2005/0074114 A1 * | 4/2005 | Fotta | ................... | H04M 3/5158 379/266.08 |
| 2013/0266127 A1 * | 10/2013 | Schachter | ........... | H04M 3/5175 379/88.01 |
| 2017/0017368 A1 * | 1/2017 | Maheshwari | ......... | G06F 3/0484 |
| 2017/0147681 A1 * | 5/2017 | Tankersley | ............ | G06F 11/321 |

* cited by examiner

*Primary Examiner* — Akelaw Teshale

(57) ABSTRACT

An example operation may include one or more of receiving a data file comprising a list of interactive voice response (IVR) prompts, identifying an IVR prompt with incorrect content that will cause an error during one or more of reading and playing of the IVR prompt, modifying the incorrect content via addition or removal of an element from text content within the IVR prompt, and storing the modified IVR prompt in memory.

17 Claims, 11 Drawing Sheets

| Prompt Name (202) | Prompt Text (204) | Date (206) | ID (208) |
|---|---|---|---|
| TAssist | Ok, go ahead and enter that number, one digit at a time | 1/14/20 | App19 |
| TAssist | Ok, go ahead and enter that number, one digit at a time | 1/14/20 | App19 |
| TAssist_1 | Ok, that was [playback ticket conf #]. Does that sound correct? | 1/14/20 | App19 |
| TAssistN1_1 | Sorry, I didn't hear you. I got [playback ticket conf #]. | 1/14/20 | App19 |
| TAssistN1_2 | Still there? If [playback ticket conf #]. | 1/14/20 | App19 |
| TAssistN1_3 | is right, press 1 for yes. Otherwise, press 2 for no. | 1/14/20 | App19 |
| TAssistNM1_1 | Sorry, I didn't quite catch that. I heard ¶ [playback ticket conf #] | 1/14/20 | App19 |
| TAssistNM1_2 | . Right? You can say 'yes' or 'no'. | 1/14/20 | App19 |
| TAssistNM2_1 | I still didn't quite catch that. If | 1/14/20 | App19 |
| TAssistNM2_2 | [playback ticket conf #] | 1/14/20 | App19 |
| TAssistNM2_3 | is right, press 1 for yes. Otherwise, press 2 for no. | 1/14/20 | App19 |
| TAssistNN1_1 | Sorry I didn't get that. I'll need to enter your ticket number, one digit at a time. | 1/14/20 | App19 |
| TAssistNN1_2 | Using your phone keypad, enter your ticket confirmation number. | 1/14/20 | App19 |
| Welcome | Thank you for calling Company 1. Press the number for your party | 2/22/20 | App36 |
| Welcome_1 | Press 1 to hear a list of names in the directory. | 2/22/20 | App36 |
| Welcome_2 | . . . | | |

| 202<br>Prompt Name | 204<br>Prompt Text | 206<br>Date | 208<br>ID |
|---|---|---|---|
| TAssist | Ok, go ahead and enter that number, one digit at a time | 1/14/20 | App19 |
| TAssist1_1 | Ok, that was [playback ticket conf #]. | 1/14/20 | App19 |
| TAssist1_2 | Does that sound correct? | 1/14/20 | App19 |
| TAssistN1_1 | Sorry, I didn't hear you. I got [playback ticket conf #]. | 1/14/20 | App19 |
| TAssistN1_2 | Still there? If [playback ticket conf #]. | 1/14/20 | App19 |
| TAssistN1_3 | is right, press 1 for yes. Otherwise, press 2 for no. | 1/14/20 | App19 |
| TAssistNM1_1 | Sorry, I didn't quite catch that. I heard [playback ticket conf #]. | 1/14/20 | App19 |
| TAssistNM1_2 | Right? You can say 'yes' or 'no'. | 1/14/20 | App19 |
| TAssistNM2_1 | I still didn't quite catch that. If [playback ticket conf #] | 1/14/20 | App19 |
| TAssistNM2_2 | is right, press 1 for yes. Otherwise, press 2 for no. | 1/14/20 | App19 |
| TAssistNN1_1 | Sorry I didn't get that. I'll need to enter your ticket number, one digit at a time. | 1/14/20 | App19 |
| TAssistNN1_2 | Using your phone keypad, enter your ticket confirmation number. | 1/14/20 | App19 |

FIG. 2C

| Prompt Name | Prompt Text | Date | ID | Xtra Pipes 212 | Missing Pipes 214 | Dup 216 | Blip 218 |
|---|---|---|---|---|---|---|---|
| TAssist | Ok, go ahead and enter that number, one digit at a time | 1/14/20 | App19 | | | | |
| TAssist | Ok, go ahead and enter that number, one digit at a time | 1/14/20 | App19 | | | X | |
| TAssist_1 | Ok, that was [playback ticket conf #]. Does that sound correct? | 1/14/20 | App19 | | X | | |
| TAssistN1_1 | Sorry, I didn't hear you. I got [playback ticket conf #]. | 1/14/20 | App19 | | | | |
| TAssistN1_2 | Still there? If [playback ticket conf #]. | 1/14/20 | App19 | | | | |
| TAssistN1_3 | is right, press 1 for yes. Otherwise, press 2 for no. | 1/14/20 | App19 | | | | |
| TAssistNM1_1 | Sorry, I didn't quite catch that. I heard ¶ [playback ticket conf #] | 1/14/20 | App19 | | | | |
| TAssistNM1_2 | . Right? You can say 'yes' or 'no'. | 1/14/20 | App19 | | | | X |
| TAssistNM2_1 | I still didn't quite catch that. If | 1/14/20 | App19 | | | | |
| TAssistNM2_2 | [playback ticket conf #] | 1/14/20 | App19 | X | | | |
| TAssistNM2_3 | is right, press 1 for yes. Otherwise, press 2 for no. | 1/14/20 | App19 | | | | |

200C

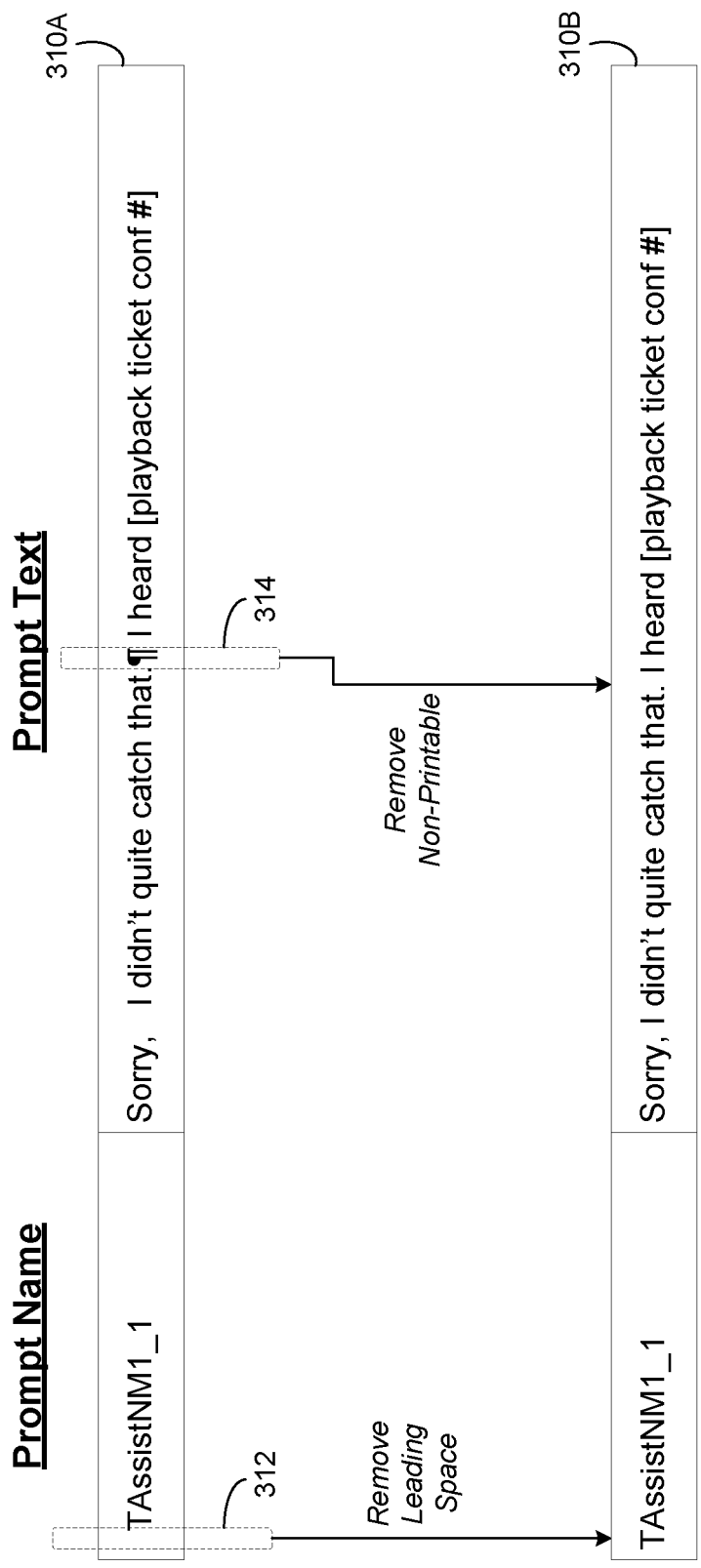

| Prompt Name | Prompt Text | Date Changed | ID |
|---|---|---|---|
| TAssist | Ok, please enter that number one digit at a time | 1/14/19 | App19 |
| TAssist | Ok, please enter that number one digit at a time | 1/14/19 | App19 |

510
511

⇒

| Prompt Name | Prompt Text | Date Changed | ID |
|---|---|---|---|
| TAssist | Ok, please enter that number one digit at a time | 1/14/19 | App19 |
| ~~TAssist~~ | ~~Ok, please enter that number one digit at a time~~ | ~~1/14/19~~ | ~~App19~~ |

510
511

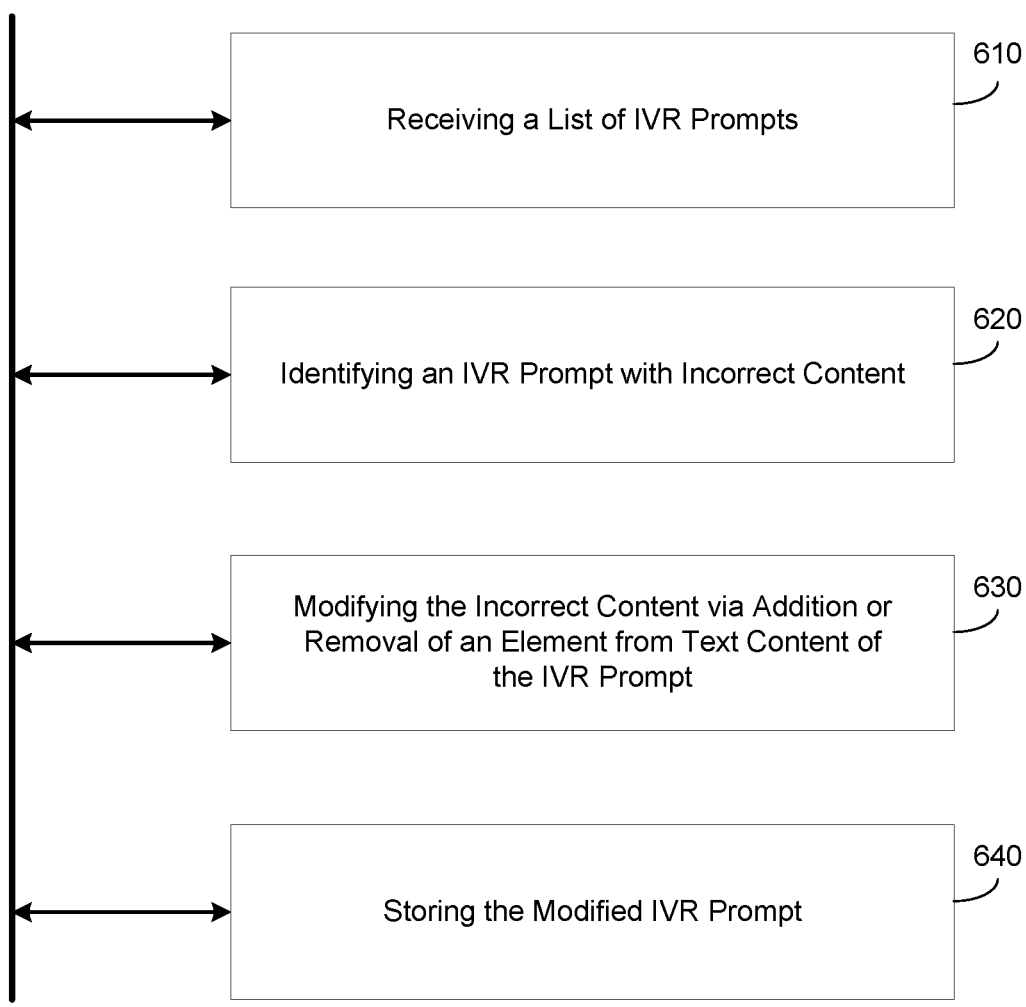

700 FIG. 7
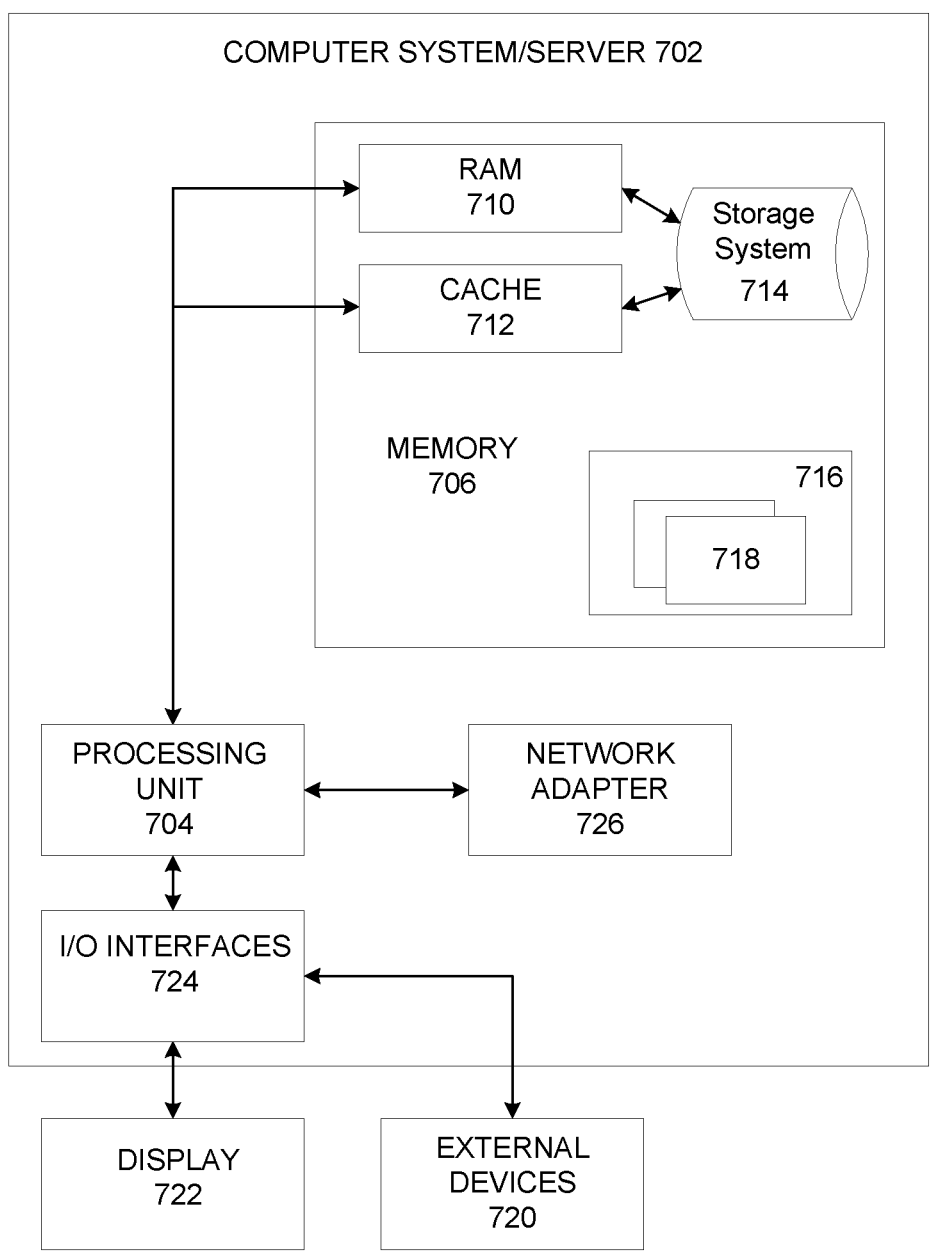

PROMPT LIST MODIFICATION

BACKGROUND

Interactive Voice Response (IVR) is a telephony technology allows a human to interact with a computer through the use of voice and touch tone inputs. In some cases, an IVR application may output pre-recorded audio as well as dynamically generated audio that is based on words, or database information collected from a user on the call. For example, an IVR prompt may request a user to repeat or verify a previously spoken input by repeating the same input. IVR uses prompts (e.g., voice prompts) to provide users with information such as instructions and directions for accessing data. For example, an IVR application may include a sequence of prompts which each include sentences, phrases, and individual words that provide greetings and informational messages.

A sequence of prompts is often generated outside of an IVR application, for example, via a document, spreadsheet or the like, and then uploaded to the application. When the text format of a prompt or a prompt name within the document is incorrect, the IVR application may not work properly. These errors can cause the IVR application to output incorrect information or stop working all together. Examples of such errors include incorrect text format, duplicates, incorrect symbol usage, hidden unnecessary symbols, and the like.

SUMMARY

One example embodiment may provide an apparatus that includes a memory, and a processor communicably coupled to the memory and configured to one or more of receive a data file comprising a list of interactive voice response (IVR) prompts, identify an IVR prompt with incorrect content that will cause an error during one or more of reading and playing of the IVR prompt, modify the incorrect content via addition or removal of an element from text content within the IVR prompt, and store the modified IVR prompt in the memory.

Another example embodiment may provide a method that includes one or more of receiving a data file comprising a list of interactive voice response (IVR) prompts, identifying an IVR prompt with incorrect content that will cause an error during one or more of reading and playing of the IVR prompt, modifying the incorrect content via addition or removal of an element from text content within the IVR prompt, and storing the modified IVR prompt in memory.

A further example embodiment may provide a non-transitory computer readable medium comprising instructions, that when read by a processor, cause the processor to perform one or more of receiving a data file comprising a list of interactive voice response (IVR) prompts, identifying an IVR prompt with incorrect content that will cause an error during one or more of reading and playing of the IVR prompt, modifying the incorrect content via addition or removal of an element from text content within the IVR prompt, and storing the modified IVR prompt in memory.

BRIEF DESCRIPTION OF THE DRAWINGS

FIG. 2A is a diagram illustrating a file including a prompt list according to example embodiments.

FIG. 2B is a diagram illustrating modifications to the prompt list of FIG. 2A, according to example embodiments.

FIG. 2C is a diagram illustrating a user interface showing flags for different errors in a prompt list, according to example embodiments.

FIG. 3 is a diagram illustrating a process of formatting a prompt name and prompt text according to example embodiments.

FIG. 5A is a diagram illustrating a process of detecting and removing a duplicate prompt according to example embodiments.

FIG. 6 is a diagram illustrating a method of modifying a prompt list according to example embodiments.

FIG. 7 is a diagram illustrating a computer system configured to support one or more of the example embodiments.

DETAILED DESCRIPTION

Figure 1:
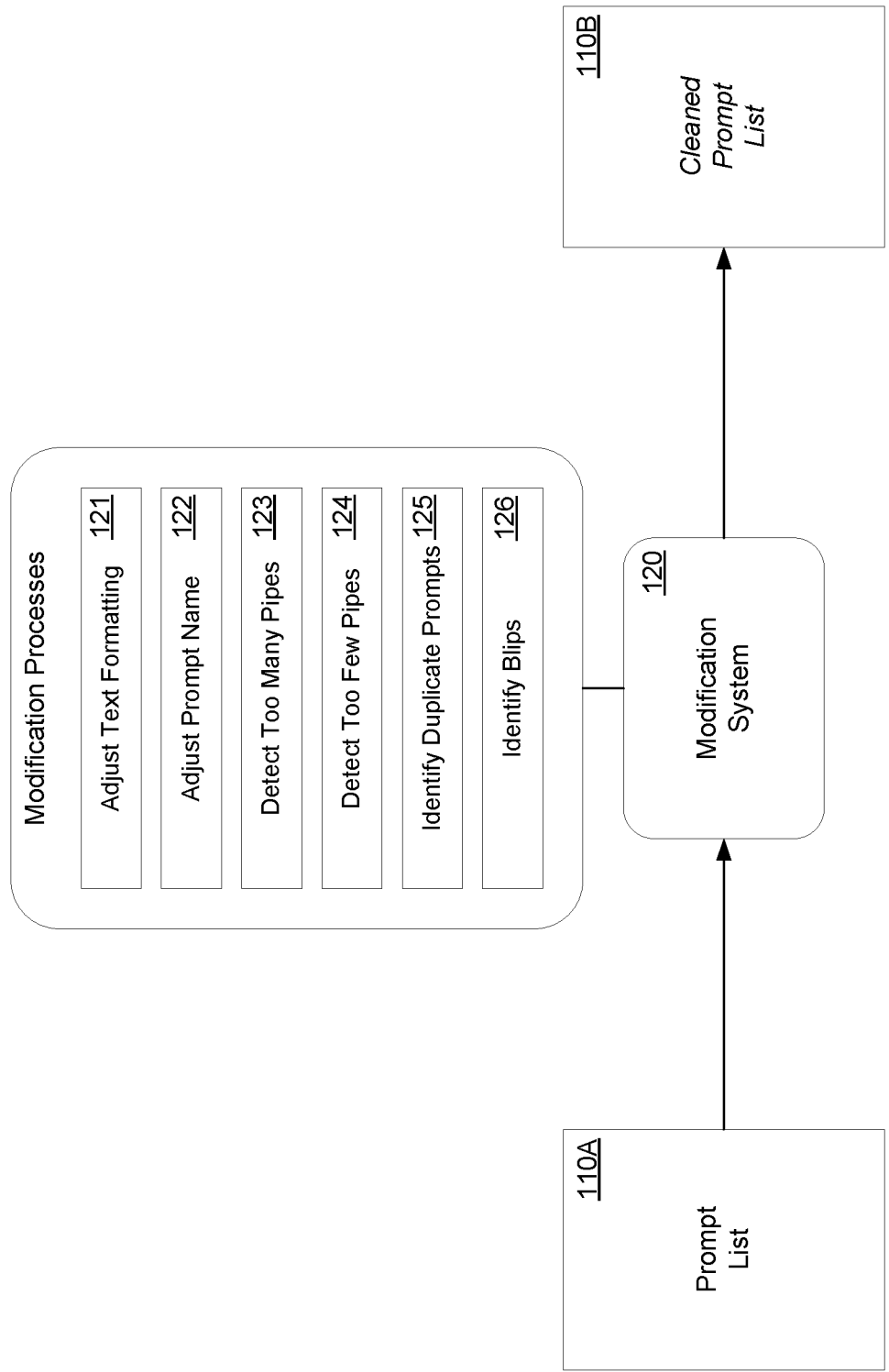
FIG. 1 is a diagram illustrating a prompt list modification system according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

The example embodiments are directed towards a prompt list modification system that can be used to cleanup errors and omissions within a sequence of prompts of an IVR application. The errors and omissions may create incorrect content that could cause the voice talent to read the prompt with incorrect inflection, or apply other inconsistencies which could cause caller frustration or confusion during playback/reading of the voice prompts. A file including a prompt list, or a group of prompt lists may be input to the system prior to be adding to an IVR application. The system may perform a number of checks on each prompt and on the prompts in whole to identify any errors. Furthermore, the system may modify the prompts, prompt names, the amount of prompts, etc., to improve the resulting audio created by the prompts during an IVR call. The system may output the modified prompt list for display, store the modified prompt list, and the like.

IVR systems are examples of computer-telephone integration (CTI). For example, a phone may communicate with a computer through the tones that are generated by each key on a telephone keypad. The tones are referred to as dual-tone multi-frequency (DTMF) signals. A computer may use hardware referred to as a telephony board or telephony card to understand DTMF signals produced by a phone. An IVR system may include a computer hooked up to a phone line through a telephony board/card and IVR software. The IVR software allows for pre-recorded greetings that are spoken during the call and menu options that a caller can select. In some cases, the IVR system may also provide video. Furthermore, the IVR system may implement dynamic concatenation which records phrases spoken by a user during the call and plays them back to the caller (e.g., dates, times, monetary amounts, account numbers, etc.)

An example use case of an IVR application is to route calls within an organization. Instead of relying on a receptionist to answer and route calls, the application can answer incoming calls and route the calls to a correct extensions within an organization. The application can present the user with a list of menu options and questions about the nature of the call. In some cases, the application may answer frequently asked questions. There are many different IVR applications, and the examples herein should not be construed as being limited to any particular type of IVR application.

During generation of the prompt content of an IVR application, a user may generate a spreadsheet, document, or other file which includes a list of prompts for the application. The user may upload the file to the system described herein. For example, the system may be a software tool running on a computing system such as a server, a user device, or the like. The system may receive the file, run different checks on the list of prompts, modify prompts, and output a modified file that is in a format that can be played by the application.

Each dialogue designer may have their own writing style when writing voice prompts for an IVR application. These differences result in prompt lists with varying degrees of formatting inconsistencies. These inconsistencies contribute to decreased efficiency because a user must manually clean up the prompt lists in order to be utilized by a prompt processing tool. A prompt list can take a user an hour or longer to review and adjust the individual prompts to clean up formatting issues.

The example embodiments provide a system which can automatically clean up a prompt list. For example, issues that can be automatically fixed by the system include removal of spaces and node extensions from a prompt name and prompt text, removal of non-printable characters (e.g., spaces, returns, paragraphs, etc.) from prompt text, removal of leading and trailing spaces from prompt text, and the like. The system may also identify when prompt text includes too many pipe symbols or not enough pipe symbols. Pipe symbols (referred to herein as pipes) are known in the IVR industry and are commonly when converting a string of prompt text into a plurality of individual prompts. A pipe may be represented as a r symbol on the keyboard. A pipe is used within prompt text where a prompt needs to be split into two or more prompt. Pipes are commonly added to the design and cause an IVR application to split the text data at the location of the pipe upon export from an external file into the application. For example, a pipe is typically placed right after a dynamic concatenation within prompt text to signify a new prompt should start immediately following the dynamic concatenation.

The modification system described herein may quickly identify human inconsistencies around key characters, such as with 'pipes' inserted into the design which control where prompts are split upon export of a prompt list from a VUI design. Furthermore, the system herein may sort like content together from an application to identify duplicates. Also, the system may remove characters that don't allow a comparison of two cells to recognize duplicate text. For example, leading spaces or various punctuation that will prohibit two like phrases from being sorted together. Furthermore, the system may remove extra spaces at the end of a phrase which could result in errors in the amount of silence or dead air to insert at the end of a file.

FIG. 1 illustrates a prompt list modification system 120 according to example embodiments. Referring to FIG. 1, the modification system 120 may be running and installed on a host device such as a server, a cloud platform, a database, a user device, and the like. A prompt list may be uploaded via the same device that is hosting the modification system 120, or via an externally connected device such as a remote user device connected via a network. In this example, a prompt list 110A is uploaded and modified by the modification system 120 to generate the cleaned prompt list 110B. Here, the prompt list 110A may be uploaded as a file, a document, a spreadsheet, or the like.

An example of the prompt list 110A is shown in FIG. 2A. Referring to FIG. 2A, the prompt list 110A is in a tabular data structure with a plurality of prompts corresponding to the plurality of rows. Each row includes different fields including a prompt name field 202, a prompt text field 204, a date of modification field 206, and an application ID field 208. Other fields may be included in the prompt list 110A, and should not be construed as being limited to the fields shown in FIG. 2A. The prompt list 110A may include prompts from multiple IVR applications that are uploaded at once for cleaning.

Referring again to FIG. 1, the modification system 120 may perform different processes 121-126 on the prompt list 110A. In this example, the processes include a text formatting adjustment process 121, a prompt name adjustment process 122, a too many pipes detection process 123, a too few pipes detection process 124, a duplicate prompt detection process 125, and a blip identification process 126. These processes are for purposes of example. It should be appreciated that the modification system 120 may perform different process, some but not all of the process, or the like. Also, there is no specific order in which the processes 121-126 must performed therefore the order can change as desired and processes may also be omitted if desired.

The text formatting adjustment process 121 may be used to clean up the format of text within the prompt text field 204 shown in FIG. 2A. For example, the text formatting adjustment process 121 may remove non-printable characters (paragraphs, returns, etc.) from the prompt text, remove leading spaces, remove trailing spaces, remove extra spaces between words, and the like. The prompt name adjustment process 122 may remove notations and characters that do not match the prompt name in other fields (or which are predefined), extra spaces, and the like.

The process 123 may detect and fix a prompt that has too many pipes. A character count may be performed by the system to determine whether bracketed text is on its own within a prompt. Here, the bracketed text identifies a dynamic concatenation which includes user captured words that are to be played back to the user. A pipe should only exist after the bracketed text within the prompt text. However, if an extra pipe has been added (e.g., before the bracketed text within the prompt) to the text prior to the dynamic concatenation, the bracketed text may be split into its own prompt thereby rendering an error when the prompt is played. To fix this, the process 123 may combine the bracketed text content of the dynamic concatenation with a previous prompt on the list to generate a combined prompt and delete the no longer needed extra prompt.

The process 124 may detect and fix a prompt that has too few pipes. A character count may be conducted by the system to determine if the bracketed text of a dynamic concatenation falls between text to be read. If so, the system determines that the prompt should have been split after the bracketed text and before the later part of the text content. To fix this, the system may generate an additional prompt and split the later part of the text content into the additional prompt.

The duplicate prompt detection process 125 may detect when two identical prompts are included in the list, or when two or more prompts share the same prompt name and App ID, but have different modification dates. Here, the duplicate prompt detection process 125 may verify that all fields are a match, or that the prompt name and App IDs are a match, but the modification dates are different. In either case, if the duplicate prompt detection process 125 detects that two prompts share the same prompt name, and application ID, the duplicate prompt detection process 125 will flag the duplicate prompt for deletion, or will flag all the duplicate prompts containing the same prompt name and App ID for deletion with the exception of the most current from the list.

The blip detection process 126 may detect when a first character in a prompt is a punctuation (referred to as a blip) instead of an alpha character. For example, if the first character contains a specific punctuation such as a period, a question mark, an exclamation mark, etc., the blip detection process 126 will flag the prompt as containing a blip.

Referring now to FIG. 2B, the prompt list 110B is shown after it has been cleaned by the modification system 120 executing the processes 121-126. Here, the prompts that are modified or newly added from the prompt list 110A are shown with bold/black lines in the cleaned prompt list 110B which is the prompt list 110A that has been modified. Furthermore, the examples of FIGS. 3-5B provide descriptions of how the modifications of each of the modified and newly added prompts shown in FIG. 2B are created.

FIG. 2C illustrates a user interface 200C showing flags for different errors in a prompt list, according to example embodiments. In this example, columns 212, 214, 216, and 218, can be marked with flags or some other indicator to indicate whether an error associated with such a flag has been detected in the prompts. For example, if a prompt has too many pipes, a flag or an indicator may be checked in a column 212 that identifies the prompt as having too many pipes. As another example, if a prompt had too few pipes, a flag or an indicator may be checked in a second column 214 that identifies the prompt as having too few pipes. As another example, if a prompt is a duplicate, the prompt may be deleted and an indicator or flag may be checked in a third column 216 of the remaining prompt indicating that it was a duplicate. As another example, if a prompt has a leading blip, a flag or an indicators may be checked within a fourth column 218 indicating the leading blip has been detected and removed. In some embodiments, the output of the modification system 120 may include a combination of the modified/fixed prompts within prompt list 110B as well as the flags/indicators in the user interface 200C.

FIG. 3 illustrates a process 300 of formatting a prompt name and prompt text of a prompt 310A according to example embodiments. Referring the FIG. 3, a prompt 310A includes a prompt name and a prompt text that may be processed using the text formatting adjustment process 121 and the prompt name adjustment process 122 shown in FIG. 1. In this example, the prompt name adjustment processes performs a scan/read of the characters included in the prompt name and removes any leading or trailing spaces. In response, the prompt name adjustment process will remove a leading space 312 in the prompt 310A to when generating the modified prompt 310B. It should also be appreciated, that the prompt name adjustment process may identify and remove node extensions (placeholder information within parenthesis connected to a prompt name reused in more than one call path that is dynamically altered to identify the numbers of callers who opted through the specific paths within a usage report), and identify and remove leading spaces and/or trailing spaces before and after the prompt name string, respectively.

In addition, the text formatting adjustment process may scan/read the text content of the prompt text of the prompt 310A and identify a non-printable character 314 which is a paragraph symbol. Here, the text formatting adjustment process may replace the non-printable character 314 with a space to generate the modified prompt text included in the modified prompt 310B. It should also be appreciated, that the text formatting adjustment process may identify trailing spaces or leading spaces before and after the prompt text. Also, the text formatting adjustment process may identify other non-printable characters such as returns.

In some embodiments, the text formatting adjustment process and the prompt name adjustment process may be performed in time. As another example, the two processes may be performed simultaneously with each other and/or with any of the other processes described in the example embodiments.

Figure 4A:
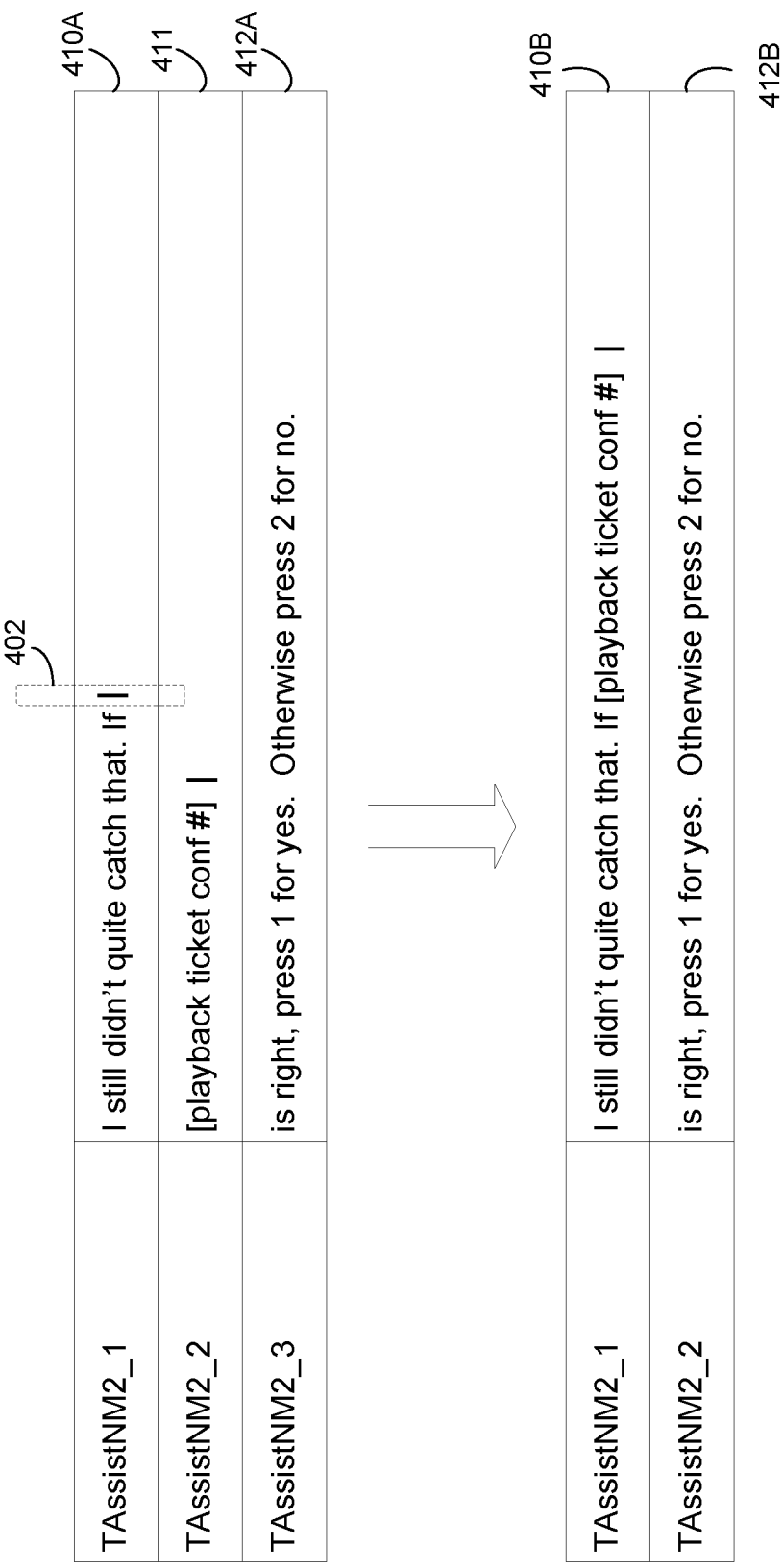
FIG. 4A is a diagram illustrating a process of detecting too many pipes in a prompt according to example embodiments.

FIG. 4A illustrates a process 400A of detecting too many pipes in a prompt according to example embodiments. In these examples, a pipe ("|") is used within a string of text content to separate a voice prompt where pre-recorded, common phrases are to be inserted in the playback audio. The pipe essentially acts as a break to divide a prompt into smaller prompts. For example, when a prompt includes a pre-recorded phrase from a user, the system expects to see a pipe inserted after the pre-recorded phrase within the prompt. However, some users may add a pipe before the pre-recorded phrase, or in other areas where it doesn't belong. In the example of FIG. 4A, the playback audio is a recording of a ticket conference number captured by an IVR application from speech of the user during a previous section of an IVR call. These phrases are variable and specific for each caller and may include dates, times, currency amounts, account numbers, ticket numbers, phone numbers, and the like.

The pre-recorded voice prompts have their own prompt names and code associated with them, so no additional recording or coding is necessary. Too many pipes leave the concatenated, pre-recorded text in its own cell and will be automatically named in the sequence of the other phrase sections from that grouping. If coded that way, the play back won't work because the code will be calling the wrong prompt name, which will pull nothing and play nothing to the caller.

Referring to FIG. 4A, the too many pipes detection process may perform a character count on each of a plurality of voice prompts 410A, 411, and 412A to determine whether the previously recorded playback audio (identified within the bracketed text) is on its own within a prompt. If it is, then too many pipes are present. In this example, an extra pipe 402 is causing the prompt to be unnecessarily split into two voice prompts 410A and 411. In this example, the too many pipes detection process may remove the extra pipe and combine or otherwise concatenate the prompt text from the two voice prompts 410A and 411 into one voice prompt 410B as shown. Meanwhile, the prompt name of the prompt 412A can be modified by the system such that the numerical order is sequential. In this case, the name of the prompt 412A is changed from "TAssistNM2_3" to "TAssistNM2_2" in prompt 412B to be in sequential order.

Figure 4B:
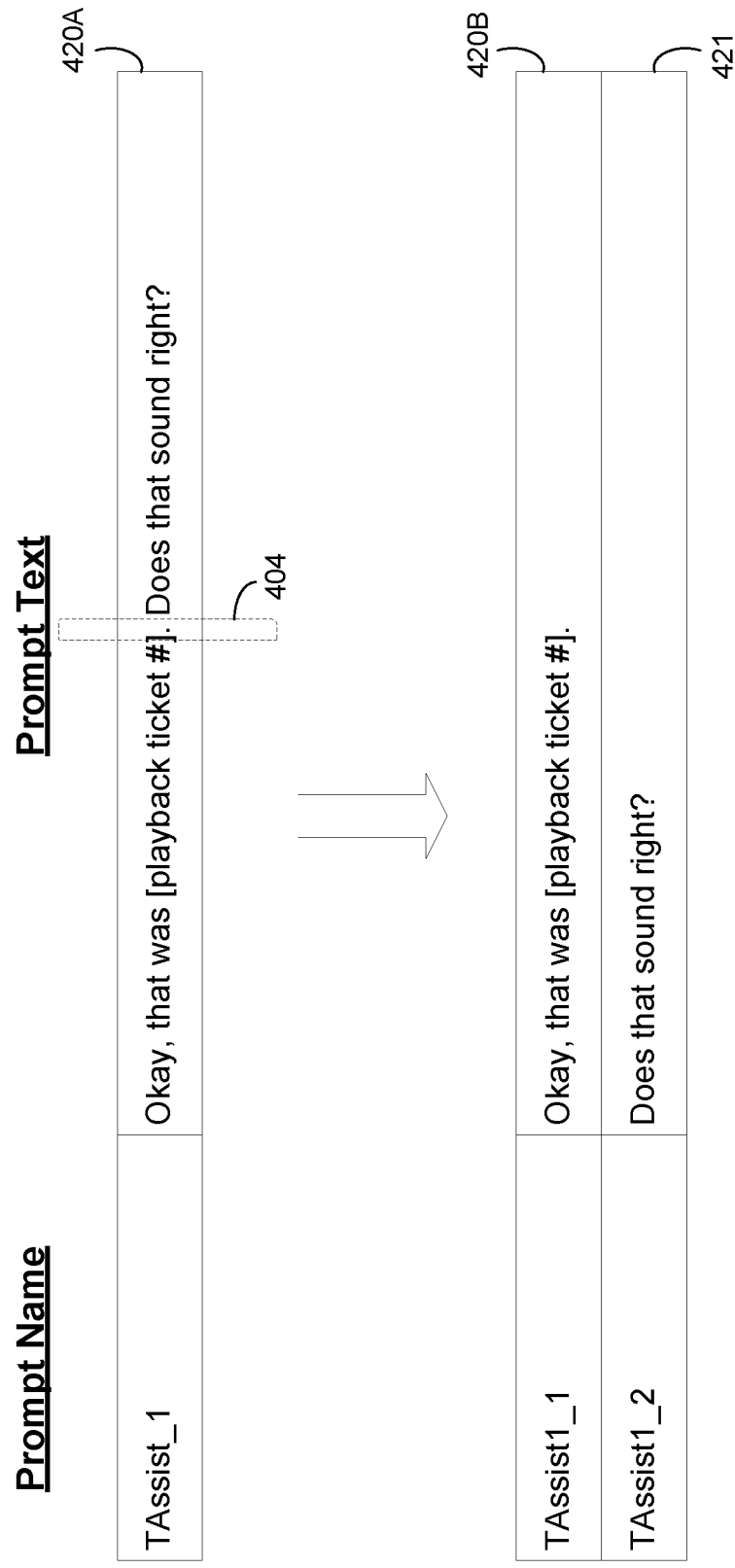
FIG. 4B is a diagram illustrating a process of detecting a missing pipe in a prompt according to example embodiments.

FIG. 4B illustrates a process 400B of detecting a missing pipe in a prompt according to example embodiments. Too few pipes will leave a pre-recorded, concatenated phrase nestled between a phrase that precedes it and another phrase that follows the concatenated piece. The phrase as a whole should be split in at least two sections with two separate prompt names. If it isn't, the phrase will remain a single prompt and not allow space for the pre-recorded voice to be inserted upon playback, causing confusion and frustration for the caller.

Referring to FIG. 4B, a pipe is missing at a location 404 within prompt text of voice prompt 420A. Here, the too few pipes detection process may perform a character count to determine if the bracketed text of a dynamic concatenation falls between two different text phrases to be read. In the case of prompt 420A, it does. Therefore, the too few pipes detection process will flag the prompt 420A, indicating a pipe is missing and needed in order to split prompt 420A into two smaller prompts 420B and 421. Furthermore, the too few pipes detection process will result in generating new prompt names for the two smaller prompts 420B and 421, and remove the old prompt 420A.

FIG. 5A illustrates a process 500A of detecting and removing a duplicate prompt according to example embodiments. Referring to FIG. 5A, the duplicate prompt detection process may identify duplicate prompt names within a prompt list. To identify the duplicate prompt names, the process sorts the entire spreadsheet by prompt name, with a secondary sort by date, new to old, in order to group like prompt names together with the most current revision at the top of the group. The process may include a process that looks at the prompt content between two prompts and compares the content in the prompt name, date modified, and app ID columns to determine if the prompt is a duplicate. If the prompt name is identical (and that means has the same app ID prefix as well), the tool looks at the date and notates the older prompt as a duplicate. In the example of FIG. 5A, prompts 510 and 511 are duplicates. Accordingly, the system deletes the prompt 511. As another example, the system could allow both prompts to remain and output a value in a duplicate column indicating one of the prompts is a duplicate of the other (e.g., the later modified file could be labeled as the duplicate).

Figure 5B:
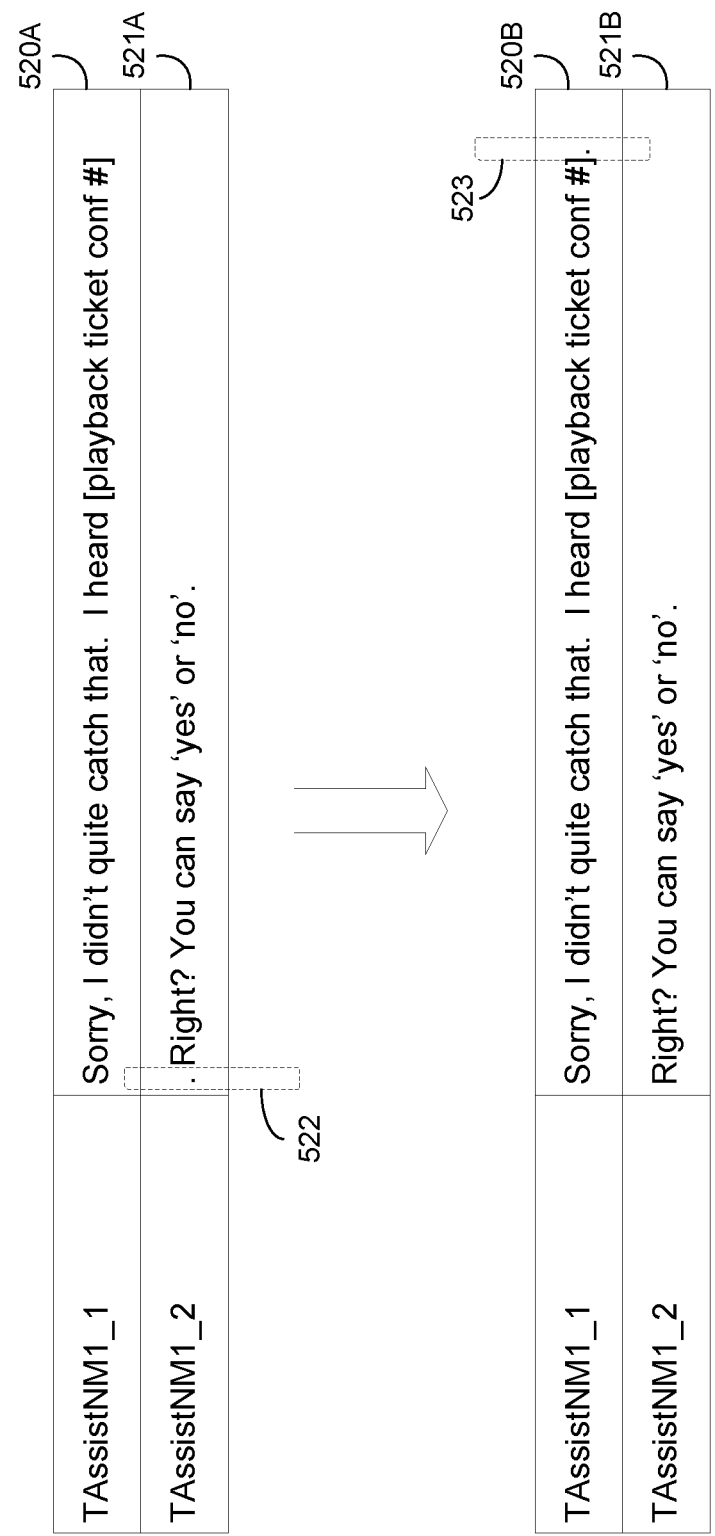
FIG. 5B is a diagram illustrating a process of detecting and removing a blip within a prompt according to example embodiments.

FIG. 5B illustrates a process 500B of detecting and removing a blip 522, which is a misplaced pipe, within a prompt 521A according to example embodiments. Here, the blip detection process may check a first character of a prompt text to determine if the first character is a comma, a period, a question mark, an exclamation point, or the like. If the answer is "true", the process flags the prompt as containing a "blip" to be removed manually within the design. In some cases, the leading spaces may already be removed from the text formatting process. The blip 522 may be moved from the text of prompt 521A into the text of prompt 520A to generate modified prompts 520B and 521B as shown in FIG. 5B. In this example, the text of prompt 520B now includes a period 523 corresponding to the blip 522.

FIG. 6 illustrates a method 600 a method of modifying a prompt list according to example embodiments. For example, the method 600 may be performed by a host system such as a computing device, a server, a cloud platform, and the like. Referring to FIG. 6, in 610, the method may include receiving a data file comprising a list of interactive voice response (IVR) prompts. For example, the data file may include a document, a spreadsheet, an XML file, and the like, which includes a list of prompts that are included in an IVR application. Each prompt may include a name, text, a date of modification, an identifier, and the like. In some embodiments, the prompts may be in a spreadsheet, but embodiments are not limited thereto.

In 620, the method may include identifying an IVR prompt with incorrect content that will cause an error during a playing of the IVR prompt. For example, one or more different checks may be performed on the content with the prompt list to identify any prompts that have predefined errors that will cause the prompts to fails, work improperly, or the like. The content of both the prompt name and the prompt text can be analyzed for each prompt.

In 630, the method may include modifying the incorrect content via addition or removal of an element from text content within the IVR prompt, and in 640, the method may include storing the modified IVR prompt in memory. For example, the method may remove any extra spaces, extra non-printable symbols, or the like. As another example, the method may identify when too many pipes have been used to divide a prompt into too many smaller prompts and when not enough pipes have been used to divide a prompt that is too large. Here, the modifications take place in the design of the prompt list. The modified or newly generated prompt list may be re-analyzed to ensure that it is correct.

In some embodiments, the identifying may include detecting an extra space within the text content of the IVR prompt, and the modifying may include removing the detected extra space from the text content. In some embodiments, the identifying may include detecting an extra symbol within the text content of the IVR prompt, and the modifying may include removing the detected extra symbol from the text content. In some embodiments, the identifying may include detecting an extra pipe symbol is included within the IVR prompt, and the modifying may include concatenating the IVR prompt with another IVR prompt based on the extra pipe symbol.

In some embodiments, the identifying may include detecting that a pipe symbol is missing from the IVR prompt, and the modifying comprises dividing the IVR prompt into two IVR prompts based on the missing pipe symbol. In some embodiments, the method may further include sorting the list of IVR prompts in an order based on prompt names. In this example, the method may further include detecting that two IVR prompts within the list are duplicates based on a common name value, a common text content value, and a different date value among the two IVR prompts, and removing one of the two duplicate IVR prompts The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

FIG. 7 is not intended to suggest any limitation as to the scope of use or functionality of embodiments of the application described herein. Regardless, the computing node 700 is capable of being implemented and/or performing any of the functionality set forth hereinabove. For example, the computing node 700 may be a network server of a larger enterprise network that connects multiple user workstations to the Internet, a private network, or the like.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units (processor) 704, a system memory 706, and a bus that couples various system components including the system memory 706 to the processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724 (which may be referred to herein as an output and/or an input). Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module.

Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
 a processor; and
 a memory storing one or more instructions that when executed by the processor configure the processor to:
  receive a data file comprising a list of interactive voice response (IVR) prompts,
  identify an IVR prompt with incorrect content that will cause an error during one or more of reading and playing of the IVR prompt,
  create a modified IVR prompt by correcting the incorrect content by removing or adding an element of content from text of the IVR prompt, and
  store the modified IVR prompt in the memory;
  wherein an extra pipe symbol in the IVR prompt is detected, wherein the modified IVR prompt is created, wherein the IVR prompt with another IVR prompt based on the extra pipe symbol is concatenated.

2. The apparatus of claim 1, wherein, when the processor is configured to identify the IVR prompt with the incorrect content, the processor is further configured to:
 detect an extra space within the text of the IVR prompt; and
 wherein, when the processor is configured to create the modified IVR prompt, the processor is further configured to:
  remove the detected extra space from the text.

3. The apparatus of claim 1, wherein, when the processor is configured to identify the IVR prompt with the incorrect content, the processor is further configured to:
 detect an extra symbol within the text of the IVR prompt; and
 wherein, when the processor is configured to create the modified IVR prompt, the processor is further configured to:
  remove the detected extra symbol from the text.

4. The apparatus of claim 3, wherein the extra symbol comprises:
 one or more of a paragraph symbol and an enter symbol.

5. The apparatus of claim 1, wherein, when the processor is configured to identify the IVR prompt with the incorrect content, the processor is further configured to:
 detect that a pipe symbol is missing from the IVR prompt; and
 wherein, when the processor is configured to create the modified IVR prompt, the processor is further configured to:
  divide the IVR prompt into two IVR prompts based on the missing pipe symbol.

6. The apparatus of claim 1, wherein the processor is configured to:
 sort the list of IVR prompts in an order based on prompt names.

7. The apparatus of claim 6, wherein the processor is further configured to:
 detect that two IVR prompts within the list are duplicates based on a common name value, a common text content value, and a different date value among the two IVR prompts; and
 remove one of the two duplicate IVR prompt.

8. A method comprising:
 receiving a data file comprising a list of interactive voice response (IVR) prompts;
 identifying an IVR prompt with incorrect content that will cause an error during one or more of reading and playing of the IVR prompt;
 creating a modified IVR prompt by correcting the incorrect content by removing or adding an element of content from text of the IVR prompt; and
 storing the modified IVR prompt in memory;
 wherein an extra pipe symbol in the IVR prompt is detected, wherein the modified IVR prompt is created, wherein the IVR prompt with another IVR prompt based on the extra pipe symbol is concatenated.

9. The method of claim 8, wherein the identifying the IVR prompt with the incorrect content further comprises:
 detecting an extra space within the text of the IVR prompt; and
 wherein the creating the modified IVR prompt further comprises:
  removing the detected extra space from the text.

10. The method of claim 8, wherein the identifying the IVR prompt with the incorrect content further comprises:
 detecting an extra symbol within the text of the IVR prompt; and
 wherein the creating the modified IVR prompt further comprises:
  removing the detected extra symbol from the text.

11. The method of claim 10, wherein the extra symbol comprises:
 one or more of a paragraph symbol and an enter symbol.

12. The method of claim 8, wherein the identifying the IVR prompt with the incorrect content further comprises:
 detecting that a pipe symbol is missing from the IVR prompt; and
 wherein the creating the modified IVR prompt further comprises:
  dividing the IVR prompt into two IVR prompts based on the missing pipe symbol.

13. The method of claim 8, further comprising:
 sorting the list of IVR prompts in an order based on prompt names.

14. The method of claim 13, further comprising:
 detecting that two IVR prompts within the list are duplicates based on a common name value, a common text content value; and
 a different date value among the two IVR prompts, and removing one of the two duplicate IVR prompts.

15. A non-transitory computer-readable medium comprising one or more instructions that when executed by a processor cause the processor to perform:
 receiving a data file comprising a list of interactive voice response (IVR) prompts;
 identifying an IVR prompt with incorrect content that will cause an error during one or more of reading and playing of the IVR prompt;
 creating a modified IVR prompt by correcting the incorrect content by removing or adding an element of content from text of the IVR prompt; and
 storing the modified IVR prompt in memory;
 wherein an extra pipe symbol in the IVR prompt is detected, wherein the modified IVR prompt is created, wherein the IVR prompt with another IVR prompt based on the extra pipe symbol is concatenated.

16. The non-transitory computer-readable medium of claim 15,
 wherein the identifying the IVR prompt with the incorrect content further comprises:
  detecting an extra space within the text content of the IVR prompt; and
 wherein the creating the modified IVR prompt further comprises:
  removing the detected extra space from the text content.

17. The non-transitory computer-readable medium of claim 15, wherein the identifying the IVR prompt with the incorrect content further comprises:
 detecting an extra symbol within the text of the IVR prompt; and
 wherein the creating the modified IVR prompt further comprises:
  removing the detected extra symbol from the text.

\* \* \* \* \*